Oct. 15, 1968    F. B. NEARY    3,405,438

METHOD OF MAKING A SPECTACLE HINGE

Filed Sept. 4, 1964

*INVENTOR.*
FRANCIS B. NEARY

BY *Thomson & Schouse*

ATTORNEYS

017
United States Patent Office 3,405,438
Patented Oct. 15, 1968

3,405,438
METHOD OF MAKING A SPECTACLE HINGE
Francis B. Neary, Rochester, N.Y., assignor to Art-Craft Optical Company, Inc., Rochester, N.Y., a corporation of New York
Filed Sept. 4, 1964, Ser. No. 394,518
18 Claims. (Cl. 29—471.9)

ABSTRACT OF THE DISCLOSURE

A method of making a spectacle hinge for either a frame or a temple member which includes (1) forming an integral hinge assembly comprising an elongated reinforcing core, a flange and a hinge, (2) embedding the core axially into the frame or temple member such that the flange cuts its own channel or fits into a precut channel and then (3) overlying the flange with a portion of the surrounding plastic to lock the hinge assembly in place.

---

This invention relates to an improved spectacle hinge construction and more specifically to an improved concealed spectacle hinge construction suitable for either the spectacle frame or spectacle temple but particularly suitable for temple construction.

There are known concealed hinge constructions, but my invention provides a concealed hinge construction which is greatly improved in strength and other characteristics and a novel method for making the same. Therefore, it is generally an object of my invention to provide improved concealed hinge construction for a spectacle frame.

Presently known hidden or concealed hinge constructions generally comprise a hinge having a flange underlying the inner surface frame or temple in an undercut channel. The hinge is secured to the frame by a pair of screws to prevent displacement from the channel. With specific reference to temple constructions, the screws traverse the temple core thereby greatly weakening the core itself. This does not provide a strong enough construction to withstand the heat applied to the plastic frames at the time lenses are inserted therein.

Moreover, normal use of such spectacle frames results in loosening of the screws. Due to lack of a completely satisfactory hidden hinge construction, commercially the older construction has dominated the field. Such older constructions provided a rivet or shield, the head of which is on the outer or front surface of the spectacle frame and rigidly secured to the hinge on the inner or back surface of the spectacle frame. However, this presents an exterior decorative or ornamental piece at each corner of the temple and the spectacle frame, which is not aesthetically desirable, particularly for masculine spectacles.

My invention provides a completely suitable concealed hinge construction greatly strengthened structurally over prior known constructions. My construction will provide a strong hinge even after heat is applied during insertion of the opthalmic lenses in the frames and will withstand normal use by the wearer thereafter. Therefore, it is a further object of my invention to provide a stronger concealed spectacle hinge construction than heretofore known.

One of the primary objects of my invention is to provide a spectacle frame free of ornamentation or embellishments on the exposed exterior surface of the frame.

As pointed out above, in the past, hidden or concealed hinges have been affixed to the temple core by traversing the core itself by a pair of screws thereby securing the hinge against outward displacement therefrom, and in some instances the screws, after traversing the core, are further embedded in the frame itself. My construction eliminates this undesirable weakening of the core member.

My invention contemplates providing or forming a core having an integral hinge portion and an integral flange portion extending coaxially with at least a portion of the hinge, such that when the core is embedded in the softened center portion of the temple in a known manner, the integral flange is also embedded into the softened plastic thereby to lock the flange and in turn the hinge against displacement. This provides a greatly improved hinge construction without the undesirable screws. To my knowledge, such a construction presents a greatly strengthened hidden or concealed hinge construction over any known constructions and without any of the disadvantages of prior known constructions. To the best of my knowledge, it is a totally new concept as applied to hinge constructions for spectacle frames.

Therefore, it is a significant object of my invention to provide a spectacle hinge construction of the nature just described.

Other objects and advantages of this invention will be particularly set forth in the claims and will be apparent from the following description when taken in connection with the accompanying drawings, in which:

Figure 1:
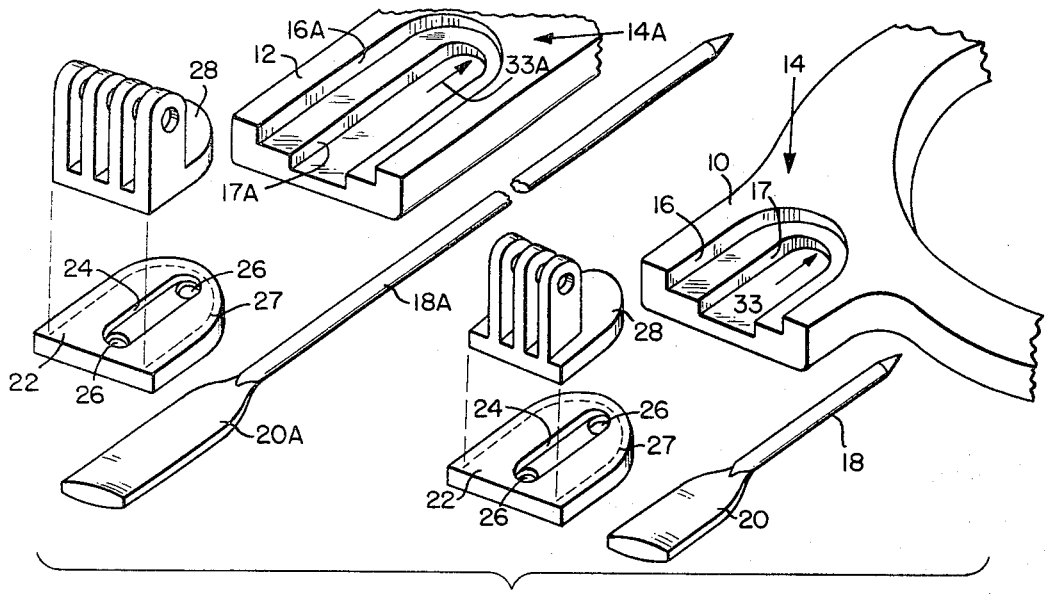
FIG. 1 is an exploded isometric view of one embodiment of my novel core construction and partial spectacle frame adapted for combination therewith.
Figures 2, 3:
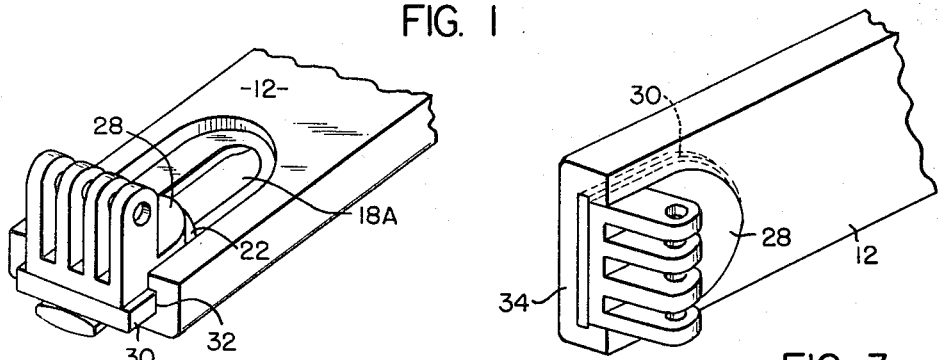
FIG. 2 is an isometric view of my assembled FIG. 1 embodiment of my novel core being inserted into a temple in accordance with my novel method.
FIG. 3 is an isometric view of my FIGS. 1 and 2 embodiment of the temple construction in finished form.

With reference to FIGURES 1 and 2, I have illustrated a "plastic" spectacle frame at 10 and a "plastic" spectacle temple at 12, each of which is provided at the terminal end thereof with a recess generally indicated by the numerals 14 and 14A. As used hereinafter, the term "plastic" shall be construed to broadly mean any type of moldable material suitable for spectacle construction, as for example Zylonite, celluloid or any one of the known plastic, rubber or like materials.

Each of the recesses 14 and 14A is formed by machining and is composed of two coaxial portions, an uppermost larger portion 16 and 16A respectively and a lowermost smaller portion 17 and 17A respectively. I provide metal reinforcing cores 18 and 18A respectively; each of these cores is provided with a terminal flattened portion 20 and 20A respectively. Such a core construction is well-known in the art and may be constructed of any suitable reinforcing material, in this particular embodiment, the flattened portions 20 and 20A have an upper surface rounded coaxially thereof as will be understood from viewing the left end of each as shown in FIG. 1.

A hinge plate 22 is provided for each of the cores 18 and 18A; each hinge plate 22 has a recessed rib 24 extending coaxially with the core and terminating at both ends in small transverse holes 26. The recessed rib 24 serves as a spacer between the hinge plate 22 and each of the cores 18 and 18A, thereby permitting the core to be soldered or brazed without annealing or softening of the core. The holes 26 receive molten solder or brazing spelter which flows freely therethrough during the soldering or brazing operation, thereby providing a superior bonding of the hinge plate 22 to each of the cores 18 or 18A.

A hinge 28, having a smaller surface than the hinge plate 22, coaxially overlies and is bonded to the plate 22, as for example, by soldering or brazing. This construction provides a substantially U-shaped peripherial flange 30 (FIG. 2) for the hinge 28. In this manner, I form a core 18 and 18A having an integral hinge 28 and an integral flange 30 extending coaxially with at least a portion of the integral hinge 28. According to my novel method described hereinafter, I overlie this flange 30 with a portion of the plastic frame 10 or temple 12 peripherially surrounding the larger recess portion 16 and 16A preferably by heat treatment, thereby to lock the flange into the frame and temple. Thereby, the flange serves as a lock portion of the core assembly for locking the hinge to the frame or temple.

In operation, after the core assembly has been completed, the assembly is then driven into the plastic frame 10 or temple 12 by a known process used in the optical industry known as "driving," whereby the plastic piece (temple or frame) is heated to the softening point, clamped in confining dies so that the outside periphery is chilled and cooled, thereby forming a hard outer crust while the inner plastic core thereof remains in a softened state. At the proper time, the core assembly is inserted or embedded at the point indicated by the arrows 33 and 33A in FIG. 1 in the softened plastic and driven through the center thereof before it cools.

In the FIGS. 1 and 2 embodiment, the smaller recess portions 17 and 17A are adapted in depth and width to receive the flattened end portions 20 and 20A of the cores 18 and 18A respectively. The larger recess portions 16 and 16A are as deep as the thickness of both the hinge plate 22 and hinge 28 but only as wide as the width of the hinge 28. When the core assembly including the integral hinge and integral flange assembly is driven axially into the axial core of the plastic frame 10 or temple 12 while soft, the flange portion 30 is embedded into the soft plastic thereby forming or cutting its own undercut channel 32 (FIG. 2). The core assembly is driven axially theerin until the hinge 28 reaches the FIG. 3 position in which the forward or right-hand edge of the hinge 28 is in abutting relationship with the corresponding edge of the larger recess portions 16 and 16A and the entire peripheral flange 30 is embedded in the plastic which overlies it.

As the softened plastic cools, it shrinks around the flange 30 and sidewalls of the hinge 28 thereby rigidly anchoring and compressionally locking the hinge plate 22 and hinge 28 into the temple or frame against any displacement from the core thus providing a greatly strengthened hinge construction over any presently known constructions.

After cooling of the core assembly in the frame or temple, the entire assembly is removed from the confining dies for finishing operations, during which the tail or left end thereof is severed and polished to provide a finished end 34 (FIG. 3).

While I have described the preferred manner of embedding the flange 30 in the temple or frame and overlying it with the plastic material thereof by driving the flange in the manner illustrated in FIG. 2, whereby it cuts tis own undercut channel 32 therein, it will be understood that the larger recessed portions 16 and 16A could be large enough to axially receive the flange 30 and thereafter the frame 10 and/or hinge 12 may be heated to a sufficiently high temperature to soften the plastic in order that it will flow over the flange 30 and upon cooling will shrink completely over the flange and around the hinge, thereby compressionally locking the flange 30 with a portion of the frame and/or temple. Hence, it will be understood that within the scope of my invention there are various ways of overlying the flange with a portion of the surrounding plastic to lock the hinge and hinge plate in position.

Figures 4, 5:
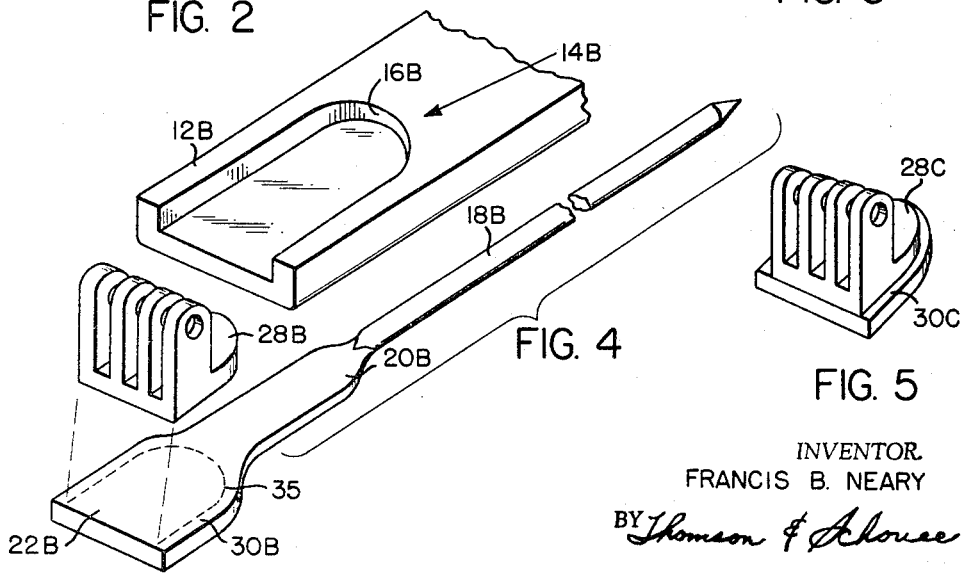
FIG. 4 is an exploded isometric view of a second embodiment of my invention.
FIG. 5 is an isometric view of a third embodiment of my novel core construction.

It will be understood that there are a number of ways that the hinge 28 and coaxial flange 30 may be manufactured integral with the cores 18 and 18A, FIGS. 4 and 5 are illustrative of several variations.

In FIG. 4, it will be understood that the tail or left end of the core 18B is flattened or otherwise formed into a hinge plate 22B to which is bonded a hinge 28B to form a flange 30B. With this construction, it will be understood that a recess 14B only has a large recess portion 16B having a depth equal to the combined depths of the hinge 28B and hinge plate 22B, but there is no smaller recess portion corresponding to 17 and 17A of FIG. 1.

In FIG. 5, a flange 30C is stamped out of the peripheral edge of the hinge 28C.

While I have shown and described the preferred form of mechanism of my invention, it will be apparent that various modifications and changes may be made therein particularly in the form and relation of parts, without departing from the spirit of my invention as set forth in the appended claims.

I claim:

1. An improved method of constructing a hinge for at least one of a plastic spectacle frame or plastic spectacle temple member, comprising the steps of:
   (a) forming an elongated reinforcing core with an integral flange portion and an integral hinge portion;
   (b) embedding said core axially into said one member; and
   (c) overlying at least a portion of said flange with a portion of said one member thereby to lock said flange into said one member.

2. An improved method of constructing a hinge for at least one of a plastic spectacle frame or plastic spectacle temple member, comprising the steps of:
   (a) forming an elongated reinforcing core with an integral flange portion and an integral hinge portion;
   (b) embedding said core axially into said one member; and
   (c) shrinking a portion of said one member surrounding said flange until it overlies at least a portion of said flange thereby to lock said flange into said one member.

3. An improved method of constructing a hinge for at least one of a plastic spectacle frame or plastic spectacle temple member, comprising the steps of:
   (a) forming an elongated reinforcing core with an integral flange portion and an integral hinge portion;
   (b) embedding said core axially into said one member; and
   (c) compressionally locking at least a portion of said flange within said one member to prevent displacement thereof.

4. An improved method of constructing a hinge for at least one of a plastic spectacle frame or plastic spectacle temple member, comprising the steps of:
   (a) forming an elongated reinforcing core with an integral hinge portion and an integral flange portion extending coaxially with at least a portion of said hinge;
   (b) embedding said core axially into said one member; and
   (c) overlying at least a portion of said flange with a portion of said one member thereby to lock said flange into said one member.

5. An improved method of constructing a hinge for at least one of a plastic spectacle frame or plastic spectacle temple member, comprising the steps of:
   (a) forming an elongated reinforcing core with an integral hinge portion and an integral flange portion extending coaxially with at least a portion of said hinge; and
   (b) embedding said core and flange axially within said one member until said flange is embedded into said one member thereby to lock said flange into said one member.

6. An improved method of constructing a hinge for at least one of a plastic spectacle frame or plastic spectacle temple member, comprising the steps of:
(a) forming an elongated reinforcing core with an integral hinge portion and an integral flange portion extending coaxially with at least a portion of said hinge and having an upper surface spaced below a top surface of said hinge; and
(b) embedding said core and flange axially within said one member until said flange is embedded into said one member thereby to lock said flange into said one member.

7. An improved method of constructing a hinge for at least one of a plastic spectacle frame or plastic spectacle temple member, comprising the steps of:
(a) forming a recess in an inner face of said one member;
(b) forming an elongated reinforcing core with an integral hinge portion and an integral flange portion extending coaxially with at least a portion of said hinge; and
(c) embedding said core and flange axially of said recess into said one member until said hinge is received in said recess and said flange is embedded and locked into said one member.

8. An improved method of constructing a hinge for at least one of a plastic spectacle frame or plastic spectacle temple member, comprising the steps of:
(a) forming a recess in an inner face of said one member;
(b) forming an elongated reinforcing core with an integral hinge portion and an integral flange portion extending coaxially with at least a portion of said hinge; and
(c) compressionally locking at least a portion of said flange within said one member to prevent displacement thereof.

9. An improved method of constructing a hinge for at least one of a plastic spectacle frame or plastic spectacle temple member, comprising the steps of:
(a) forming a nelongated reinforcing core with an integral hinge portion and an integral flange portion extending coaxially with at least a portion of said hinge;
(b) softening an axial portion of said one member adapted to receive said core and flange; and
(c) embedding said core and flange axially into said softened axial portion until said flange is embedded and locked into said one member.

10. An improved method of constructing a hinge for at least one of a plastic spectacle frame or plastic spectacle temple member, comprising the steps of:
(a) forming an elongated reinforcing core with an integral hinge portion and an integral flange portion extending coaxially with at least a portion of said hinge and having an upper surface below an upper surface of said hinge;
(b) softening an axial portion of said one member adapted to receive said core and flange; and
(c) embedding said core and flange axially into said softened axial portion until said flange is embedded and locked into said one member.

11. An improved method of constructing a hinge for at least one of a plastic spectacle frame or plastic spectacle temple member, comprising the steps of:
(a) forming a recess in an inner face of said one member;
(b) forming an elongated reenforcing core with an integral hinge portion and an integral flange portion extending coaxially with at least a portion of said hinge;
(c) softening a portion of said one member coaxially of said recess; and
(d) embedding said core axially into said one member until said hinge is received in said recess and said flange is embedded and locked into said softened portion of said one member.

12. An improved method of constructing a hinge for at least one of a plastic spectacle frame or plastic spectacle temple member, comprising the steps of:
(a) forming an elongated reinforcing core with an integral hinge portion and an integral flange portion extending peripherially beyond and coaxially with at least a portion of said hinge; and
(b) embedding said core and flange axially within said one member until said flange is embedded into said one member thereby to lock said flange into said one member.

13. An improved method of constructing a hinge for at least one of a plastic spectacle frame or plastic spectacle temple member, comprising the steps of:
(a) forming an elongated reinforcing core with an integral hinge portion and an integral flange portion extending peripherially beyond and coaxially with at least a portion of said hinge;
(b) embedding said core axially into said one member; and;
(c) compressionally locking at least a portion of said flange within said one member to prevent displacement thereof.

14. An improved method of constructing a hinge for at least one of a plastic spectacle frame or plastic spectacle temple member, comprising the steps of:
(a) forming a recess in an inner face of said one member;
(b) forming an elongated reinforcing core with an integral hinge portion and an integral flange portion extending peripherially beyond and coaxially with at least a portion of said hinge;
(c) softening a portion of said one member coaxially of said recess; and
(d) embedding said core and flange axially into said one member until said hinge is received in said recess and said flange is embedded and locked into said softened portion of said one member.

15. An improved method of constructing a hinge for at least one of a plastic spectacle frame or plastic spectacle temple member, comprising the steps of:
(a) forming a recess in an inner face of said one member;
(b) bonding an elongated reinforcing core, a hinge plate and a hinge having a smaller surface area than said plate together in a manner forming a core with an integral hinge portion and an integral flange portion extending peripherially beyond and coaxially with at least a portion of said hinge;
(c) softening a portion of said member coaxially of said recess; and
(d) embedding said core and flange axially into said one member until said hinge is received in said recess and said flange is embedded and locked into said softened portion of said one member.

16. An improved method of constructing a hinge for at least one of a plastic spectacle frame or plastic spectacle temple member, comprising the steps of:
(a) forming a recess in an inner face of said one member;
(b) forming a hinge plate having a recessed rib and a hole in said rib through which bonding substance may flow;
(c) bonding an elongated reinforcing core, said hinge plate and a hinge having a smaller surface area than said plate together by flowing a suitable bonding substance into said rib and out of said rib holes in a manner forming a core with an integral hinge portion and an integral flange portion extending peripherally beyond and coaxially with at least a portion of said hinge;
(d) softening a portion of said one member coaxially of said recess; and (e) embedding said core and flange axially into said one member until said hinge is received in said recess and said flange is embedded and locked into said softened portion of said one member.

17. An improved method of constructing a hinge for at least one of a plastic spectacle frame or plastic spectacle temple member, comprising the steps of:
  (a) forming an elongated reinforcing core with an integral hinge portion and an integral lock portion underlying said hinge suitable for locking said hinge in said one member when overlaid with a portion of said one member;
  (b) embedding said core axially into said one member;
  (c) overlying said lock portion of said core with a portion of said one member thereby to lock said hinge into said one member.

18. A method in accordance with claim 17 including a step of softening an axial portion of said one member adapted to receive said core and lock portion before embedding said core into said member, so that said softened plastic flows into locking relationship with said lock portion when said core is embedded.

References Cited

UNITED STATES PATENTS

| | | |
|---|---|---|
| 1,582,898 | 5/1926 | Bobrow. |
| 1,718,986 | 7/1929 | Searles _____ 351—153 |
| 2,160,686 | 5/1939 | Splaine et al. _____ 29—496 X |
| 3,241,904 | 3/1966 | Ditto _____ 351—121 |
| 1,649,791 | 11/1927 | Welsh _____ 351—177 |
| 1,649,792 | 11/1927 | Welsh _____ 351—177 |
| 1,650,576 | 11/1927 | Welsh _____ 351—177 |

FOREIGN PATENTS

| | | |
|---|---|---|
| 225,604 | 3/1959 | Australia. |
| 247,794 | 12/1963 | Australia. |
| 767,345 | 1/1957 | Great Britain. |
| 974,380 | 11/1964 | Great Britain. |

JOHN F. CAMPBELL, *Primary Examiner.*

J. L. CLINE, *Assistant Examiner.*